(No Model.)
2 Sheets—Sheet 1

G. H. DAMON.
GATE.

No. 456,020.
Patented July 14, 1891.

George H. Damon.
Inventor

Witnesses
L. S. Elliott.
E. W. Johnson by [signature]
Attorney (No Model.)  G. H. DAMON.  2 Sheets—Sheet 2.
GATE.

No. 456,020.  Patented July 14, 1891.

Witnesses  George H. Damon.
L. S. Elliott.  Inventor
C. W. Johnson  by
  Attorney

UNITED STATES PATENT OFFICE.

GEORGE H. DAMON, OF PAW PAW, ILLINOIS.

GATE.

SPECIFICATION forming part of Letters Patent No. 456,020, dated July 14, 1891.

Application filed March 12, 1891. Serial No. 384,701. (No model.)

*To all whom it may concern:*

Be it known that I, GEORGE H. DAMON, a citizen of the United States of America, residing at Paw Paw, in the county of Lee and State of Illinois, have invented certain new and useful Improvements in Gates; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in devices for operating swinging gates; and it consists in the construction and combination of the parts, as will be hereinafter fully set forth, and particularly pointed out in the claims.

Figure 1:
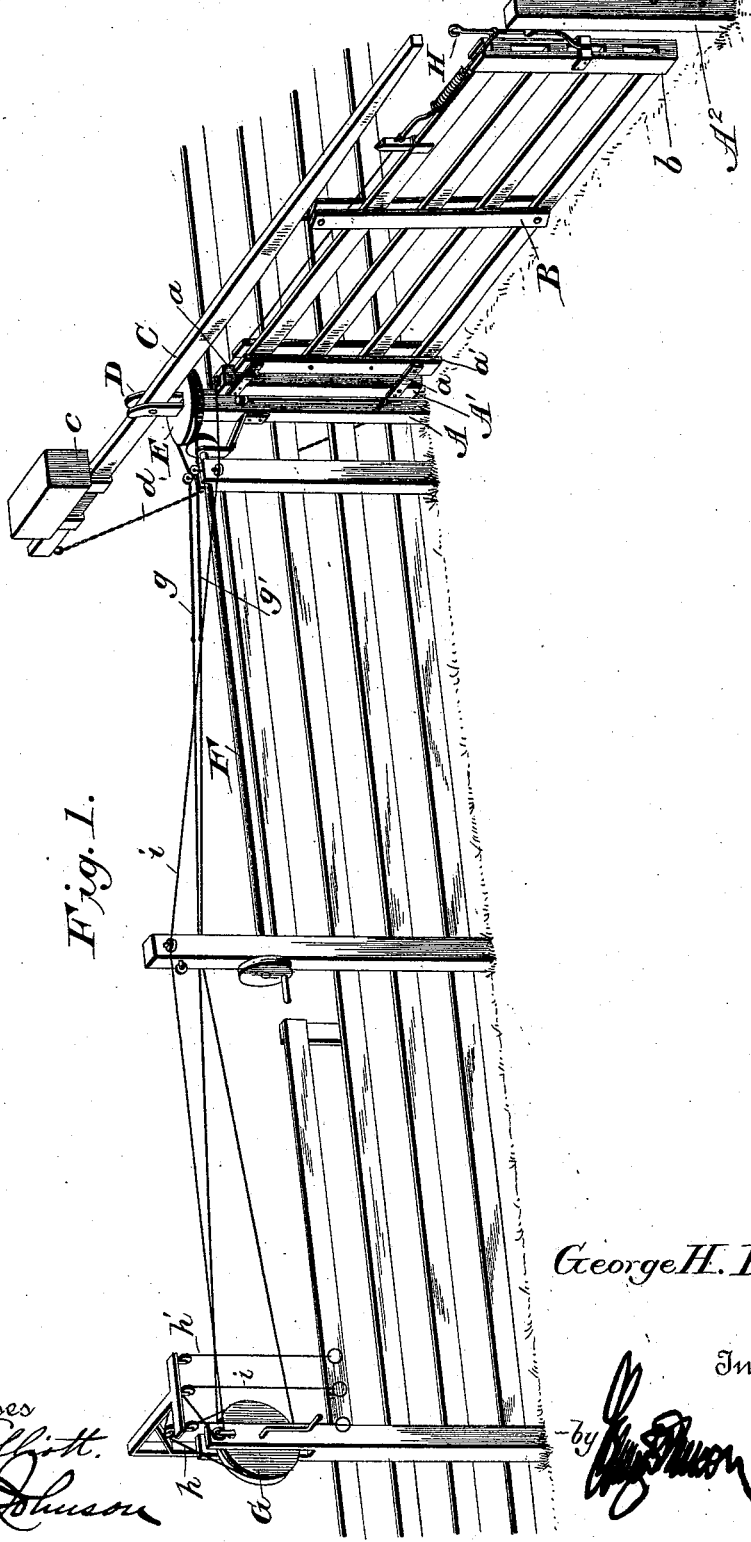
Figure 2:
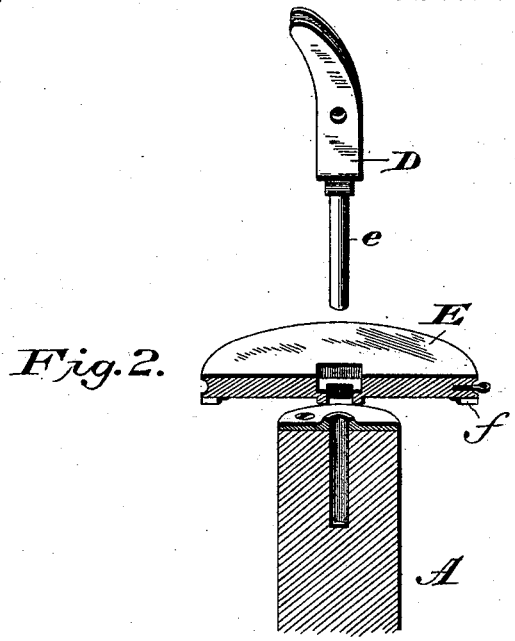
Figure 3:
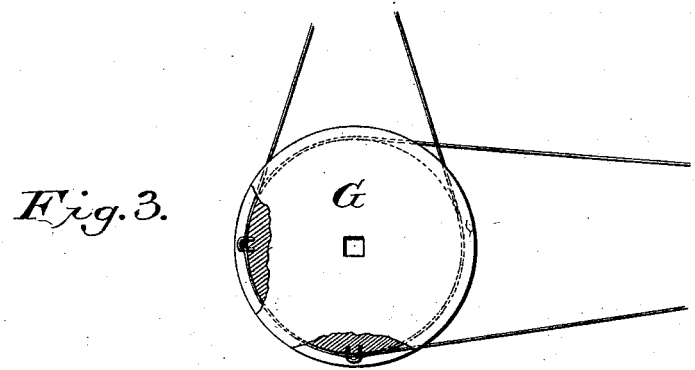

In the accompanying drawings, forming part of this specification, Figure 1 is a perspective view showing my improvements applied to a gate. Fig. 2 is a detail sectional view of a part of the wheel and fixtures carried by the gate-post. Fig. 3 is a side view, partly in section, of the operating-disk G.

A refers to the main supporting-post, which is provided on one side, with eyes, through which passes a vertical pin which engages eyes on the post A', which permits said post to have a pivotal movement. The gate is connected to the pivoted post A' by straps $a$, said gate being made up of the vertical battens $a'$ and $b$, to which the rails are bolted to allow the gate to be upwardly inclined when desired.

To the center portion of the lower rail of the gate are secured bars B B, their upper ends being connected to each other by a transverse bolt, which passes through a bail secured to the pivoted lever C, said lever being provided at its rear end with a box or receptacle $c$ for weight. The outer end of this lever is connected by a chain or rope $d$ to the lower end of the post A, so that when the gate is opened in either direction the weighted end of the lever will be drawn downwardly and the front portion of the gate elevated. The chain $d$ can be tightened, so as to hold the gate raised to the desired extent when closed. The lever or weighted bar C is pivotally secured to the fixture D, the upper portion of which is bifurcated, and below said bifurcated portion is secured a pin $e$, having a square head which fits within a rectangular aperture in the wheel E, said wheel being held above the post A by a pin $e$. The wheel E is provided with a grooved periphery and on its under side with gear-teeth $f$, which mesh with a beveled wheel on the shaft F, which is secured to the fence so as to be substantially at right angles with the gate. The end of this shaft opposite the beveled wheel carries a grooved disk, from which projects a handle, as shown. To the periphery of the wheel or disk E are secured cords or flexible connections $g$ and $g'$, which pass partially around the periphery of said wheel, and from thence over suitable guide-pulleys to the disk G, to which they are suitably attached. This disk G has also attached to its grooved periphery cords or flexible connections $h$ and $h'$, which pass over suitable guide-pulleys attached to a bracket-arm, the lower ends of said cords being provided with suitable rings.

By providing the gate with the operating devices hereinbefore described it will be obvious that when the disk G is turned either by drawing upon the cords $h$ or $h'$ or by turning the disk G one of the flexible connections $g$ $g'$ will be drawn upon, while the other is slackened, and thus the disk E will be turned and carry with it the weighted lever attached to the gate, so as to swing the gate open or parallel with the fence. The disk and flexible connections shown in Fig. 1 may be repeated on the other side of the gate, and then by turning the disk G in a reverse direction the gate can be closed.

When desired, the gate is provided with a spring-latch H, which can be retracted out of engagement with the catch carried by the gate A² by drawing upon the flexible connection $i$, which passes over suitable guide-pulleys to the bracket-frame, where the end depends between the connections $h$ and $h'$, and when such a latch is provided the flexible connection $i$ should be drawn upon before the disk is operated. If desired, instead of using the flexible connections $h$ and $h'$, I may use in lieu thereof the horizontal shaft having the gear-wheel and operate the same either directly by hand or through the intervention of cords.

Having thus described my invention, what

I claim as new, and desire to secure by Letters Patent, is—

1. In combination with a swinging gate, the post A, carrying a revoluble disk E, a fixture D serving as a bearing for securing the same to the gate, said fixture moving with the disk and carrying a weighted lever C, which is connected to the gate and to the gate-post, substantially as set forth.

2. The combination, in a swinging gate, of a supporting-post A, having pivotally secured at its upper end a disk, a pivoted lever moving with said disk, said lever being connected to the gate and by a flexible connection to the gate-post, and means, substantially as shown, for turning said disk so as to open and elevate the gate, for the purpose set forth.

3. In combination with a swinging gate, a post provided at its upper end with a disk E, having a bifurcated fixture which turns with the disk, a weighted bar secured to the fixture and connected to the gate and gate-post, cords $g$ and $g'$, attached to the periphery of said disk and guided over suitable pulleys to a disk G, located some distance from the gate, and means for turning said disk G, substantially as shown.

In testimony whereof I affix my signature in presence of two witnesses.

GEORGE H. DAMON.

Witnesses:
ROBERT RICHEY,
DAVID E. THOMAS.